Sept. 14, 1965     E. J. CHADEK     3,205,858
CANOPY BIRD HOUSE
Filed May 19, 1964     2 Sheets-Sheet 1
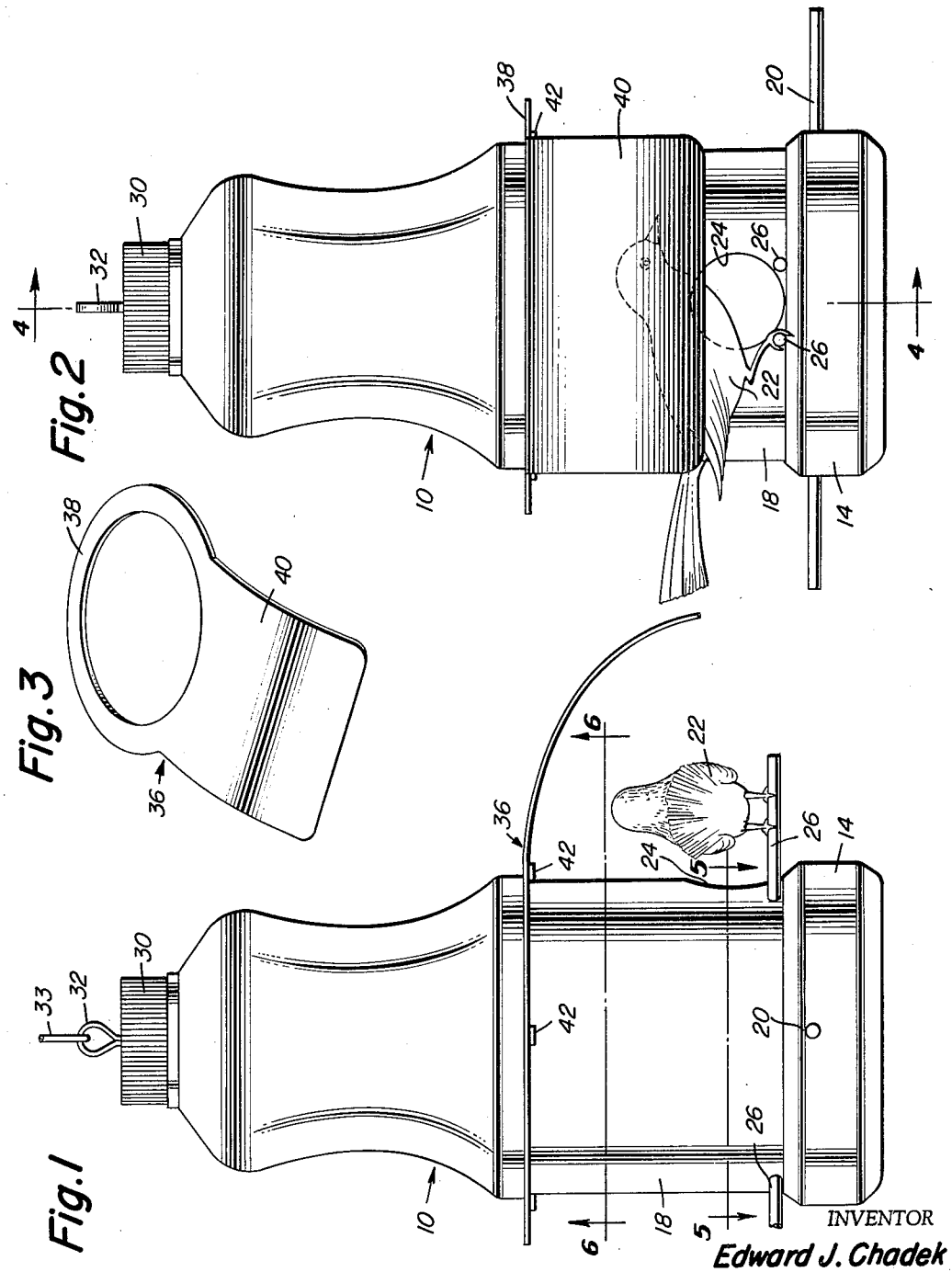
INVENTOR
*Edward J. Chadek*
BY
ATTORNEY Sept. 14, 1965  E. J. CHADEK  3,205,858
CANOPY BIRD HOUSE
Filed May 19, 1964  2 Sheets-Sheet 2
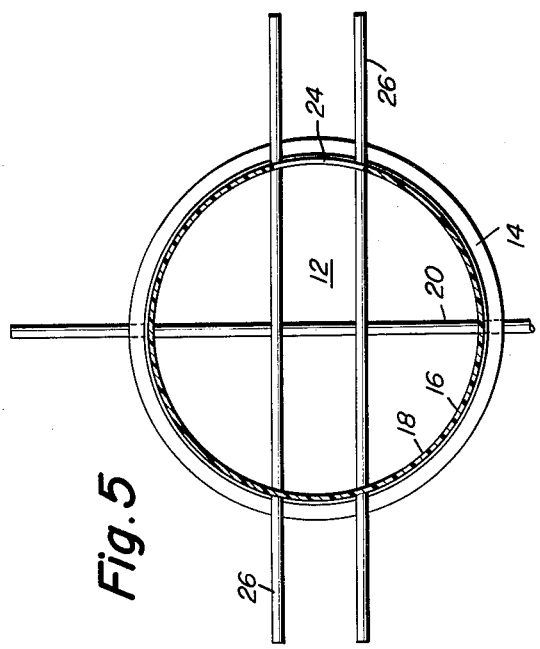
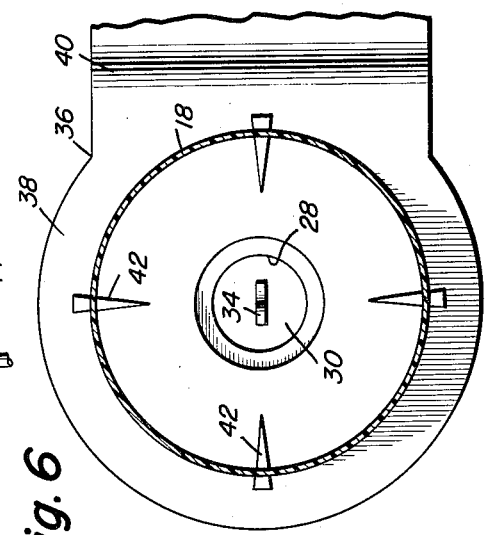
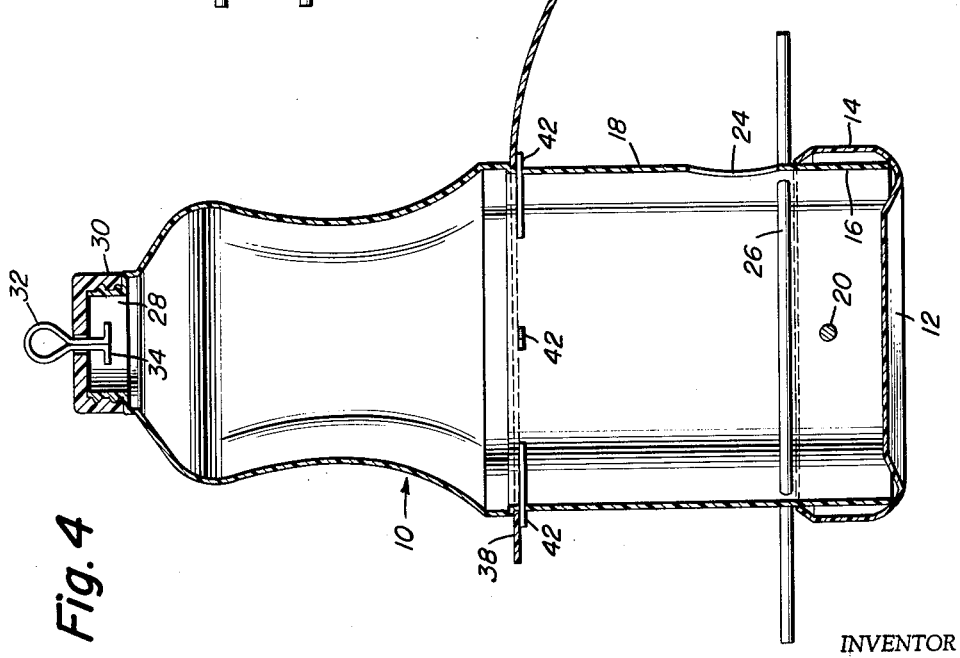
INVENTOR
Edward J. Chadek
BY
ATTORNEY

United States Patent Office 3,205,858
Patented Sept. 14, 1965

3,205,858
CANOPY BIRD HOUSE
Edward J. Chadek, 2209 61st Court, Cicero, Ill.
Filed May 19, 1964, Ser. No. 368,617
4 Claims. (Cl. 119—23)

This invention relates to a bird house and has for an object to provide an improved bird house, to which a canopy may be attached.

A further object of this invention is to provide a bird house which is light weight, inexpensive, waterproof, and insulated against heat and cold, which is vermin-proof and non-toxic. In addition, it is easily cleaned, and cracks or rot are impossible because of the material used and because of the novel construction.

Still a further object of this invention is to provide a bird house that is most inexpensive to manufacture from the standpoint of the cost of the material, because it is made principally of a material that normally is not only completely wasted, but is often a problem to dispose of, the material used being empty plastic bottles, such as now commonly used for liquid detergents, starches, bleaches, etc., and of course, can be made of new, empty plastic bottles.

A further object of this invention is to provide a bird house which can be made in different sizes for different size birds, by merely selecting an appropriate size of existing plastic bottle, there already being plastic bottles available in pint or quart sizes to more than five quart sizes.

Still a further object of this invention is to provide a bird house with a readily removable bottom floor for easy cleaning and wherein the means for holding the bottom floor in place also serves as a bird perch both inside and outside the bird house.

Still a further object of this invention is to provide a bird house made of a plastic bottle wherein the floor is provided by merely cutting off the bottle bottom with its normally bulging adjacent lower side portion, and discarding a slight annulus so that the flange left on the bottom will then overlap about the lower part of the bottomless bottle to which it may be removably pinned by inserting a perch rod through the overlapping bottom flange and bottle part.

A further object of this invention is to provide a bird house with a readily attachable canopy, to provide a roof apron for a bird perched on a perch rod extending outside the bird house, which canopy may be located to extend over a doorway aperture through the side of the bird house and thus prevent rain from entering through the doorway aperture.

Still a further object of this invention is to provide a bird house suspending means wherein a suspending eye is secured to the bottle cap so that, once the eye is suspended in the selected position, the house may be temporarily removed, as for cleaning, by merely unthreading it from the cap.

With the above and related objects in view, this invention consists in the details of construction and combination of parts, as will be more fully understood from the following description, when read in conjunction with the accompanying drawing, in which:

FIG. 1 is an elevation of the bird house in operative position.

FIG. 2 is a view looking toward the right hand side of FIG. 1.

FIG. 3 is a perspective view of the canopy

FIG. 4 is a section on line 4—4 of FIG. 2.

FIG. 5 is a section on line 5—5 of FIG. 1.

FIG. 6 is a section on line 6—6 of FIG. 1.

There is shown at 10 the canopy bird house of this invention as made from an empty plastic bottle of suitable size, the bottle being of the type commonly available on the market in connection with household bleach, starch, detergent, etc. Such bottles normally have their bottoms 12 connected to their sides by a bulging lower side portion. This bottom 12 and bulging side is cut off from the bottle, leaving this bulging side portion as an upstanding flange 14 attached to the bottle bottom or floor 12. A somewhat cylindrical annulus between the bulging side and bottle is cut off and discarded, so that the bottom flange 14 may be placed in overlapping relation about the lower side portion 16 of the now bottomless plastic bottle 18. A rod 20 is pushed through aligned apertures formed in the overlapping bottom flange 14 and lower side portion 16 to detachably pin the bottom or floor 12 to the lower side portion 16, and simultaneously provides a perch rod, both internally and externally, for a bird 22 to perch on.

Just above the top edge of overlapping bottom flange 14 a bird doorway aperture 24 is cut, preferably in a circle, of a suitable size for the bird 22 to enter the house 10. Also above the upper edge of the overlapping flange 14 a pair of parallel perch rods 26 are placed through aligned apertures in opposite sides of the bird house 10, the rods 26 being located somewhat below the doorway aperture 24. These perch rods 26 also provide internal and external perches for birds to sit on, and extend at right angles to the pinning perch rod 20, as seen in FIG. 5.

The bottle 18 is provided with the customary threaded bottle neck 28 on which is detachably secured the usual threaded cap 30, herein shown as being of plastic, but sometimes made of metal. Secured through this cap is an eye 32, from which the bird house 10 may be suspended in any suitable location, as by a small cable or string 33 tied thereto. This eye 32 may be formed by inserting a cotter pin, of suitable size, through a hole formed in the center of the cap 30, with its botttom ends spread apart at 34.

Next, a canopy 36 is provided as a roof over the doorway aperture 24. This canopy 36 is made of the same material as the bird house, and has an annulus 38 extending from a curved apron or roof 40, the annulus 38 having its opening to snugly fit over the bottle 18 from which the bird house 10 is formed, and is supported in proper position by wedge shaped pins 42 forced through the sides of the bottle of the bird house 10.

The position and shape of the canopy 36, with its longitudinal axis disposed in the vertical plane of the protruding perch rod portions 26 adjacent the entrance opening 24 limits access to such protruding perch rod portions to birds of a size small enough to fit under the canopy curved down portion 40, and thus prevents birds that are too large from attempting to enter through the entrance opening 24.

This canopy 36 may be cut from a large size plastic bottle, and the wedge pins 42 may likewise be cut from the waste material of the annulus of the canopy 36.

The making of the bird house 10, either as a home project or as a commercial undertaking, is apparent from the above description. In operation, the bird house 10, with its canopy in position, is suspended at any desired location by the string or cable 33 tied to the eye 32. Whenever it is desired to clean the bird house 10, it is unthreadeed from its cap 30 and taken down, then the single pinning perch rod 20 is removed, separating the bottom floor 12 from the side portion 16, so that the bird house 10 may be thoroughly cleaned, both inside and out. Then, it is reassembled and threaded back to its suspended cap, ready for bird occupancy again.

Although this invention has been described in considerable detail, such description is intended as being ilustrative rather than limiting, since the invention may be variously embodied, and the scope of the invention is to be determined as claimed.

Having thus set forth and disclosed the nature of this invention, what is claimed is:

1. A bird house formed of light weight, waterproof plastic material, comprising two readily separable parts to permit access to the interior for cleaning purposes or the like, one part comprising a bottomless plastic bottle having an entrance opening provided in a side portion thereof, the other part comprising a plastic bottle bottom having an upstanding flange fitting in overlapping relation about the lower edge portion of said bottomless plastic bottle and extending only to a point below the entrance opening, protruding bird perch rod means including a portion extending through overlapping portions of said bottom upstanding flange and said bottle lower edge pinning said bottom and bottle removably together and protruding outside of said bottle providing both interior and exterior bird perch rod means, a portion of said protruding perch rod means extending through the bottle portion and protruding outside thereof being adjacent said entrance opening, an elongated canopy of flat sheet material secured with the bottle portion above the entrance opening and having a downwardly curved portion extending beyond the projecting end of said protruding perch rod means limiting access to the perch rod means adjacent said entrance opening, said elongated canopy having its longitudinal axis disposed in the vertical plane of said protruding perch rod means adjacent said entrance opening.

2. The bird house of claim 1, said plastic bottle having a top bottle neck, said neck having an opening, a bottle cap removably secured on said bottle neck over said opening, and a bird house suspension eye on said cap secured thereto.

3. The bird house of claim 2, said canopy having an annulus fitting about said plastic bottle, said downwardly curved portion providing a canopy roof curving downwardly from said canopy annulus, and peg means through the side of said bottle supporting said canopy annulus.

4. The bird house of claim 3, said bird perch means including, a pair of perch rods extending through opposite sides of said plastic bottle, one perch rod being adjacent each side of said doorway aperture.

References Cited by the Examiner

UNITED STATES PATENTS

| | | | |
|---|---|---|---|
| 2,219,297 | 10/40 | Copeman | 119—23 |
| 2,260,018 | 10/41 | Garthus | 119—23 |
| 3,043,461 | 7/62 | Glassco | 215—1 |

References Cited by the Applicant

UNITED STATES PATENTS

| | | |
|---|---|---|
| 2,417,178 | 3/47 | Ritter. |
| 3,049,093 | 8/62 | Oliver. |
| 3,087,460 | 4/63 | Stone. |

SAMUEL KOREN, *Primary Examiner.*

HUGH R. CHAMBLEE, *Examiner.*